United States Patent [19]

Coe et al.

[11] Patent Number: 4,943,304

[45] Date of Patent: Jul. 24, 1990

[54] PROCESS FOR THE PURIFICATION OF BULK GASES USING CHABAZITE ADSORBENTS

[75] Inventors: Charles G. Coe, Macungie; Thomas R. Gaffney, Allentown, both of Pa.

[73] Assignee: Air Products and Chemicals, Inc., Allentown, Pa.

[21] Appl. No.: 334,668

[22] Filed: Apr. 6, 1989

[51] Int. Cl.$^5$ ............................................. B01D 53/04
[52] U.S. Cl. ......................................... 55/66; 55/68; 55/71; 55/72; 55/75
[58] Field of Search .................. 55/66, 68, 71, 72, 75, 55/389; 502/85

[56] References Cited

U.S. PATENT DOCUMENTS

| | | | |
|---|---|---|---|
| 4,481,018 | 11/1984 | Coe et al. | 55/75 X |
| 4,544,378 | 10/1985 | Coe et al. | 55/75 X |
| 4,663,052 | 5/1987 | Sherman et al. | 55/75 X |
| 4,713,362 | 12/1987 | Maroulis et al. | 502/85 |
| 4,732,584 | 3/1988 | Coe et al. | 55/75 X |
| 4,747,854 | 5/1988 | Maroulis et al. | 55/75 X |

FOREIGN PATENT DOCUMENTS 841812 7/1960 United Kingdom .

OTHER PUBLICATIONS

W. J. Mortier et al., "Positions of Cations and Molecules in Zeolites with the Chabazik Framework," *Mat. Res. Bull.*, vol. 12, pp. 97-102 (1977).

D. W. Breck, Zeolite Molecular Sieves, Structure, Chemistry, and Use, John Wiley & Sons, 1974, pp. 107-110.

S. Cartlidge et al., "Role of potassium in the thermal stability of CHA- and EAB-type zeolites", *Zeolites*, 1984, vol. 4, Jul., pp. 226-230.

"Zeolite Molecular Sieves," D. W. Breck, John Wiley and Sons, New York, p. 110, (1974).

"Role of potassium in the thermal stability of CHA- and EAB-type zeolites," S. Cartlidge et al, Zeolites, vol. 4, p. 226, (1984).

*Primary Examiner*—Robert Spitzer
*Attorney, Agent, or Firm*—Mark L. Rodgers; William F. Marsh; James C. Simmons

[57] ABSTRACT

A process is provided for the selective adsorption of one or more minor constituents from a bulk gas stream using a chabazite in which the bulk gas is size excluded from the pore structure of the chabazite or the minor constituent to be separated has a heat of adsorption greater than that of the bulk gas and the process is carried out under conditions such that the partial pressure of the minor constituent is in the linear low pressure region of the isotherm for the minor constituent and the adsorbent is a dehydrated divalent cation-containing chabazite having a Si/Al ratio of 1.8 to 2.7, a cation sitting, $f_s$, of 0.7 to 1, and a cation distribution, $f_d$, of 0.62 to 1.

7 Claims, 7 Drawing Sheets

4,943,304

PROCESS FOR THE PURIFICATION OF BULK GASES USING CHABAZITE ADSORBENTS

FIELD OF THE INVENTION

This invention relates to a process for the removal of trace impurities from bulk gases utilizing a divalent ion exchanged and dehydrated chabazite adsorbent.

BACKGROUND OF THE INVENTION

Recent requirements of the electronics industry for purer gases and verification of contaminant levels have increased interest in the use of zeolitic adsorbents for removing trace nitrogen from argon. Divalent chabazites have been disclosed as useful adsorbents for removing trace nitrogen from argon, for purifying methane, and for quantitatively separating oxygen from argon in chromatographic applications. The intrinsic properties of chabazites expand the range of contaminant gases which can be removed economically from bulk gases using standard adsorption techniques and the calcium form of chabazite, properly activated, is perhaps the most energetically sorbing molecular sieve for both polar and non-polar gases.

However, the availability of high-grade chabazite is extremely limited. Pure chabazite exists only rarely in nature and is too expensive to be used as a commercial adsorbent. Synthetic analogues of chabazite are known and have been designated D, R, G, and ZK-14 (Breck, *Zeolite Molecular Seives*, John Wiley and Sons, New York, N.Y., p 110 (1974) and Cartleidge et al., *Zeolites*. 4, 226 (1984}). However, known methods for preparing commercially useful synthetic chabazites are not practical since they suffer from low yields, poor product purity, long cystallization times, and are difficult if not impractical to scale-up. Chabazite-based adsorbents will only be fully exploitable commercially when an economic chabazite having sufficiently improved adsorbing properties for weakly interacting adsorbates is available on a large scale.

SUMMARY OF THE INVENTION

It has now been found that chabazites having a Si/Al ratio of 1.8 to 2.7, which have divalent cations distributed throughout the framework such that the number of large pores which contain one or two divalent cations is maximized, have improved adsorption properties over any other zeolites for weakly interacting adsorbates such as nitrogen. Heretofore, we thought that the best chabazite for scavenging weakly interacting adsorbates would depend only on the number of calcium ions and hence a chabazite with an Si/Al ratio of 1 would afford the highest capacity. Unexpectedly, it has been found that the number of adsorption sites and, consequently, the adsorption capacity, varies systematically with composition. Both the framework Si/Al ratio and cation siting and distribution in the zeolite were found to influence the nitrogen adsorption properties of the chabazite. The adsorptive capacity of calcium chabazite determined by cation siting, or fraction of cations accessible by siting requirements, ($f_s$), of from about 0.7 to 1 and a cation distribution, and fraction of cations accessible by distribution requirements, ($f_d$), of 0.62 to 1. Accordingly, the invention provides an improvement in the process for the selective adsorption of one or more minor constituents from a gas stream containing such constituents which comprises contacting the gas stream with the dehydrated divalent cation-containing chabazite adsorbent of the invention, provided that the minor constituent to be separated has a heat of adsorption greater than that of the bulk gas or the bulk gas is size-excluded from the pore structure of the chabazite adsorbent and further provided that the process is operated under conditions such that the partial pressure of the minor constituent is in the linear low pressure region of the isotherm for the minor constituent.

By linear low pressure region is meant that portion of the isotherm in which the ratio of the change in volume adsorbed to the change in pressure is at least 200 cc(STP)/g-atm.

By dehydrated is meant that the chabazite is treated until the residual water content is less than about 1.5 wt % of the chabazite, preferably by heating.

DETAILED DESCRIPTION OF THE INVENTION

U.S. Pat. Nos. 4,713,362 and 4,732,584 disclose chabazites as suitable adsorbents for removing trace nitrogen from argon, for purifying methane, and for quantitatively removing oxygen from argon in chromatographic applications. Properly dehydrated forms of chabazite are disclosed in U.S. Pat. No. 4,732,584 as displaying unusually high heats of adsorption for weakly adsorbing gases such as nitrogen, particularly at low partial pressures, for a given set of conditions. The chabazites of this invention are suitable for use as described in U.S. Pat. Nos. 4,713,362 and 4,732,584 which are incorporated herein by reference for all that they disclose.

Figure 5:
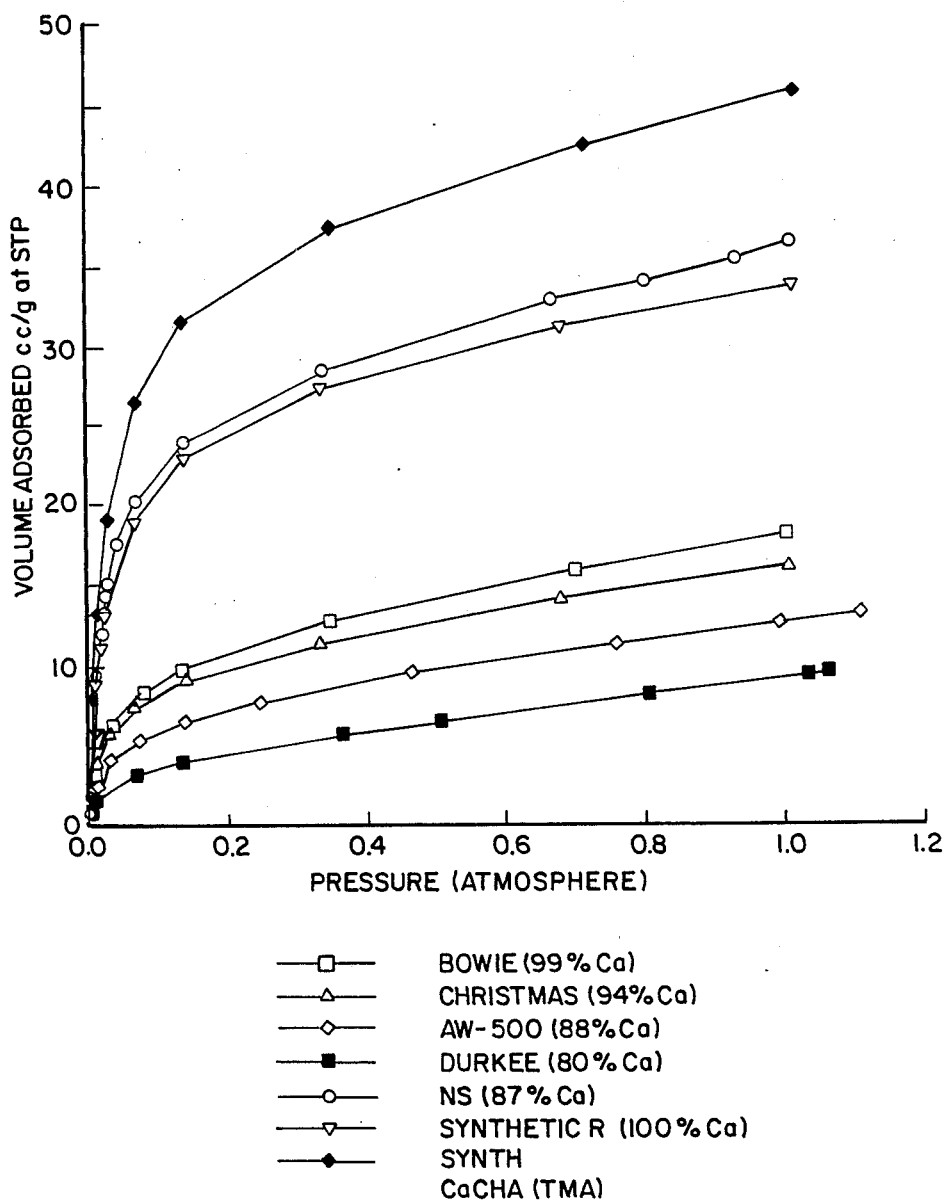
FIG. 5 compares nitrogen isotherms at 30° C. for various highly calcium exchanged, thoroughly dehydrated chabazites against a chabazite of the invention.

Notwithstanding the contribution of the broad class of chabazites disclosed as adsorbents in U.S. Pat. Nos. 4,713,362 and 4,732,584, it has been found that there is a particular class of chabazites which offers significantly improved adsorption properties over any disclosed in those patents. Nitrogen isotherms for various natural and synthetic chabazites versus the nitrogen adsorption curve for chabazites of this invention as shown in FIG. 5 clearly illustrate the greatly increased adsorption capacities of the chabazites of this invention.

Figure 1:
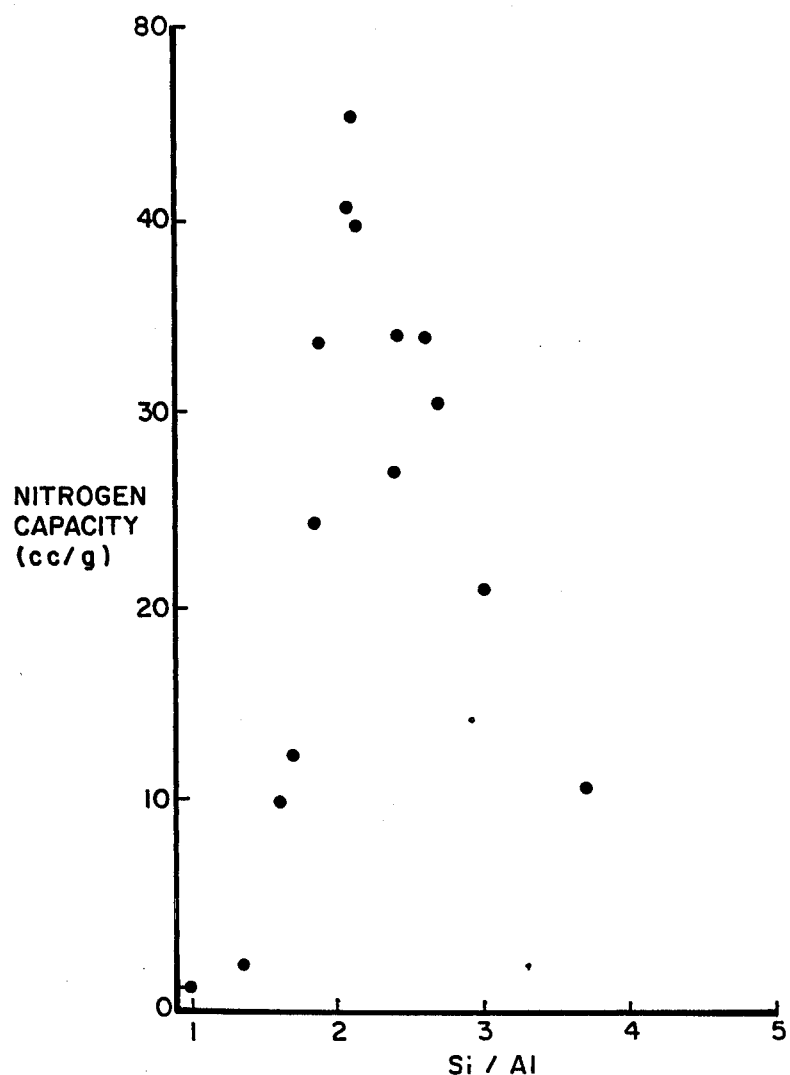
FIG. 1 is a plot of the nitrogen capacity of chabazite-type zeolites versus the zeolite framework Si/Al ratio measured at 30° C., 1 atm.

Preferred chabazites of the invention in the divalent exchanged form have the composition $M_{x/2}^{2+}[(SiO_2)_{12-x}(AlO_2)_x]$ where $x = 3.24 - 4.28$ and $M^{2+}$ is a divalent cation, preferbly calcium or strontium. The exchanged chabazites have a framework Si/Al ratio of from about 1.8 to about 2.7. preferably 1.9 to 2.3, most preferably 2, and demonstrate improved adsorption properties over any other zeolite for weakly interacting adsorbates such as nitrogen. Heretofore, we thought that the best chabazite for scavenging weakly interacting adsorbents would depend only on the number of calcium ions and hence a chabazite with a Si/Al ratio of 1 would afford the highest capacity as is the case with faujasites. Surprisingly, a plot of the nitrogen capacity of the chabazites of the invention versus Si/Al ratio as in FIG. 1 shows a clear maximum at Si/Al=2.

Figure 2:
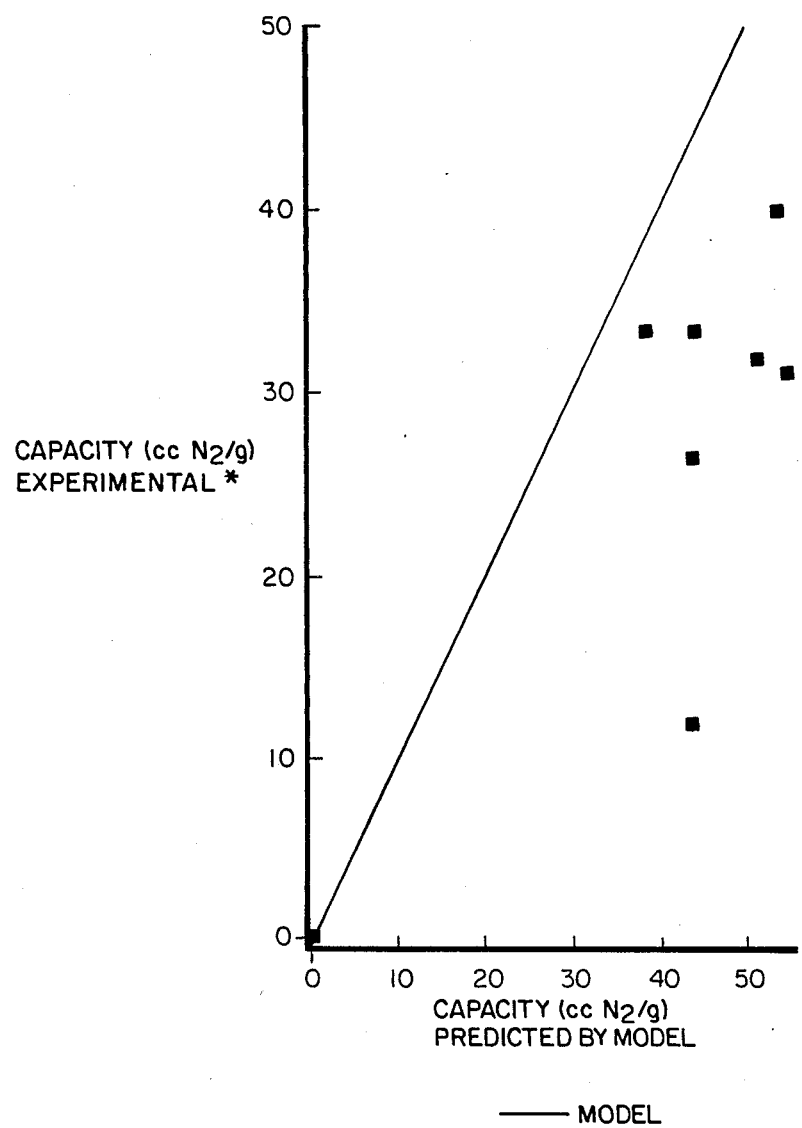
FIG. 2 correlates the actual nitrogen capacity at 30° C., 1 atm. to that predicted based solely on cation siting.

Assuming that, when site II positions in chabazite contain $Ca^{2+}$ ions (Mortier, et al. *Mat. Res. Bull.*, 12, 97 (1977)), one nitrogen molecule sorbs per divalent calcium ion in site II, and that when a third cation is present in the chabazite pore the two adsorption sites at position II are destroyed due to pore blockage, the sorption capacity can be predicted as a function of composition. Accordingly, the dependence of the nitrogen capacity of chabazites on framework composition should be given by the straight line in FIG. 2. However, experimental data plotted in FIG. 2 are all lower than the predicted values and show no apparent correlation between the predicted values and the experimental data. Therefore, the divalent cation content alone does not determine the adsorptive capacity of a chabazite adsorbent; distribution and siting of the cations in the structure are also key structural parameters.

Figure 3:
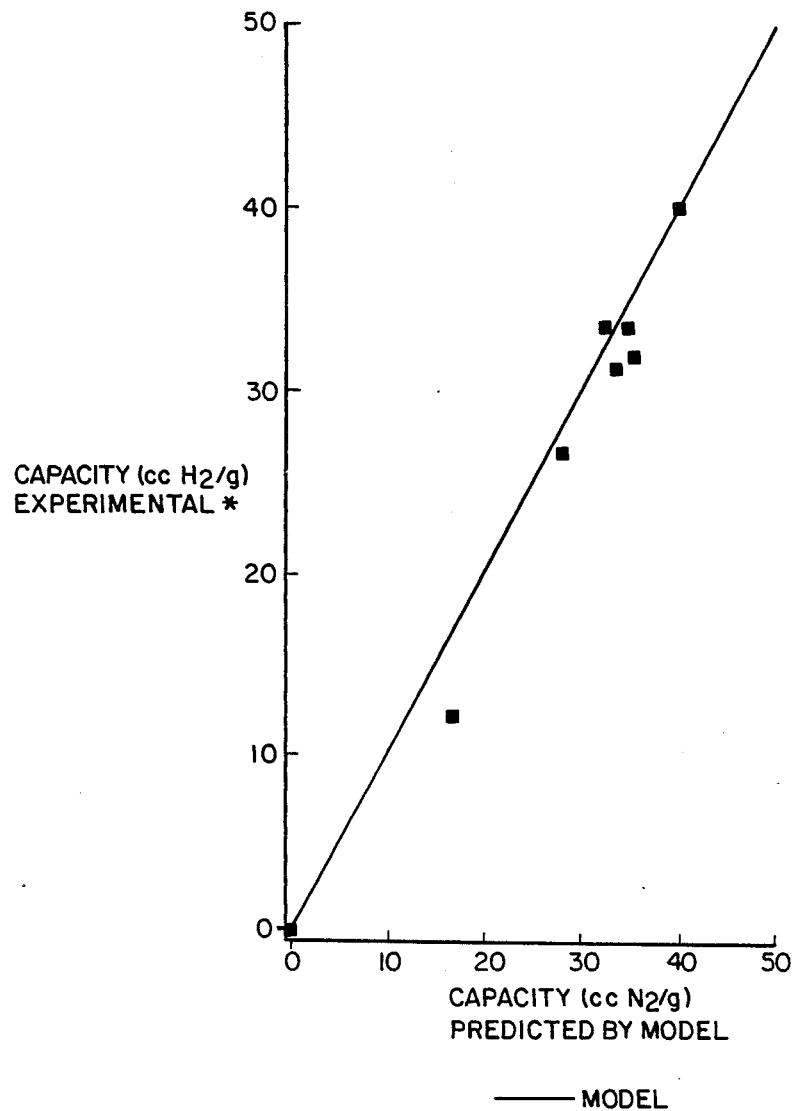
FIG. 3 correlates the actual nitrogen capacity at 30° C., 1 atm. to that predicted based on both cation siting and aluminum distribution.

Using solid state $^{29}Si$ NMR (nuclear magnetic resonance) data, it is possible to determine the relative amount of silicon in each of the five chemically distinct environments, Si(nAl), where n denotes the number of aluminum atoms connected directly through oxygen to silicon (i.e., nearest neighbors) and can be 0–4. Since the divalent cations compensate for the negative charges associated with aluminum atoms in the framework structure, on the average, two divalent cations will be associated with each Si(4Al), 3/2 with a Si(3Al), one with each Si(2Al), and ½ with each Si(1Al) site. It has been found that only divalent cations associated with Si(2Al) and Si(1Al) sites adsorb nitrogen. When the values predicted for nitrogen adsorption using the siting hypothesis which gives the straight line of FIG. 2 are scaled to reflect that only the fraction of cations associated with Si(2Al) and Si(1Al) sites contribute to the capacity of chabazite adsorbents, the predicted versus experimental values fall on a straight line as shown in FIG. 3. This shows that one nitrogen molecule is adsorbed per divalent cation accessible by siting and distribution requirements.

The fraction of cations accessible by distribution requirements, $f_d$, can be calculated from NMR data using the formula:

$$f_d = \frac{R}{2}\left(Si(2Al) + \frac{Si(1Al)}{2}\right)$$

where R is Si/Al. The fraction of cations accessible by siting requirements, $f_s$, is given by the formula.

$$f_s = 0 \text{ for } R \geq 5$$
$$f_s = (5 - R)/3 \text{ for } R = 2 - 5.$$
$$f_s = R - 1 \text{ for } R = 1 - 2.$$

Accordingly, a Si/Al ratio ranging from 1.8 to 2.7 with siting ($f_s$) and distribution ($f_d$) ranging from 0.7 to 1 and 0.62 to 1, respectively, will provide the unexpected improvements of this invention.

The adsorptive capacity of the chabazites of the invention in moles/g is given by the equation: $C = f_s f_d nM$, where nM is the number of moles of divalent cations per gram of adsorbent. For divalent cations of suitable size to occupy either site I or II, $nM = \frac{1}{2}(60.08R + A.W./2 + 58.98)$ where A.W. is the atomic weight of the divalent ion. For calcium chabazite, $nM = \frac{1}{2}(60.08R + 79.02)$. The volumetric adsorptive capacity expressed at STP is designated throughout as $C_v$. $C_v$ generally ranges from about 35 to about 56 cc/g, preferably 45 to 56 cc/g to provide increased adsorption capacity, and most preferably 56 cc $N_2$/g for the best adsorption capacity.

Initial attempts to correlate adsorptive capacity with composition revealed that there is a much larger increase in the adsorptive capacity than can be explained by cation content. As Si/Al ratios were decreased from 4 to 2, the calcium content of the zeolite increased by 67% while the adsorptive capacity increased by 350%. Increasing the cation content from 1.2 to 2 ions per unit cell generates many more adsorption sites than would be expected if each cation adsorbs only one nitrogen molecule. Accordingly, cation siting or the fraction of cations accessible by siting requirements ($f_s$) and cation distribution or the fraction of cations accessible by distribution requirement ($f_d$) in the zeolite are critical structural parameters for generating adsorption sites. In general, the chabazites of the invention have an $f_s$ ranging from about 0.7 to 1, preferably 0.9 to 1, most preferably 1, and an fd ranging from about 0.62 to 1, preferably 0.8 to 1, most preferably 1. The most preferred adsorbent of the invention has a Si/Al ratio of 2, an $f_s$ of 1 an $f_d$ of 1 and, hence, aluminum as homogeneously distributed throughout and within the crystallites as possible.

Since nitrogen is too large to pass through a six-ring aperture, cations in site I (Mortier, et al., *Mat. Res. Bull.* 12, 97, (1977)) are inaccessible to nitrogen. Cations in site II are accessible to nitrogen since nitrogen can pass through the larger eight-ring window of the cavity. It has been hypothesized that fractional occupancy of sites I and II vary with calcium content. (Mortimer et al., *Mat. Res. Bull.*, 12, 97 (1977)).

For several ultra-high capacity chabazites, the predicted nitrogen adsorption capacities are lower than the experimental values. It is believed that this reflects the inability of NMR to adequately resolve the Si(3Al) peak from the Si(2Al) peak.

The unique chabazites of the invention require significantly lower dehydration temperatures than prior materials and have enhanced adsorption properties which make them more efficient in adsorption beds. Their higher capacity gives them longer onstream capability before regeneration is required. The reason the chabazites of the invention can achieve full capacity at much lower dehydration temperatures is not fully understood. For partially dehydrated chabazites, the chabazites of the invention having a Si/Al ratio of 1.8 to 2.7 and the siting and distribution parameters outlined above will have more dehydrated/dehydroxylated cations accessible to nitrogen and, hence, a higher nitrogen adsorbing capacity.

According to the laws of adsorption technology, an adsorbent can be used to effect the separation of a gaseous mixture in two ways: (1) using a carrier gas stream (such as GC analysis), or (2) by the principle of frontal analysis. Since as taught in U.S. Pat. No. 4,732,584, the polyvalent forms of chabazite can effectively separate oxygen and nitrogen from argon, it should be possible to remove oxygen and nitrogen from argon by the principle of frontal analysis. The efficiency of such a process will depend on a number of factors including the concentrations of the components to be removed, temperature of the process, and adsorption properties of the various gases on the particular adsorbent.

Due to high heats of adsorption for nitrogen exhibited by the thoroughly dehydrated divalent forms of chabazite, these adsorbents have sufficient nitrogen capacity to have practical utility for removing nitrogen impurities from argon. This is a direct consequence of the thermodynamic adsorption properties of these adsorbents. The calcium form of chabazite has a limiting nitrogen heat of adsorption of $-11.0$ kcal/mole and a nitrogen/argon selectivity of 15° at 30° C. The high values for these intrinsic properties are directly responsible for the increased capacity of these adsorbents for nitrogen in the presence of argon.

Even though these same adsorbents display the capability of separating oxygen from argon in a chromatographic application, both the gas capacity and oxygen/argon selectivity are much too low to have practical utility for removing oxygen from argon. On the other hand, gases having significant quadrapole moments or permanent dipole moments should have sufficiently high adsorption properties that they can be removed from other bulk gases possessing lower adsorption properties. Because the calcium form of the chabazites of the invention is particularly useful for adsorption of weakly interacting adsorbates it is most preferred.

In general, the chabazites of the invention display improved properties for removing low levels of gas contaminants having larger heats of adsorption than the bulk component. Some of the gas purifications which should be possible include removing dilute CO from hydrogen, dilute nitrogen from hydrogen, dilute methane from hydrogen, dilute methane from nitrogen, dilute nitrogen from noble gases, trace oxygen from noble gases, trace oxygen from hydrogen. Noble gases include helium, neon, argon, krypton, and xenon.

Also, the combination of the shape-selective properties of the small pore chabazites and their increased heat of adsorption suggests that the adsorbents of this invention would be superior for removing nitrogen or other weakly interacting gases from bulk gases whose kinetic diameter exceeds that of the adsorbent's pore opening. For example, carbon tetrafluoride can be purified in this manner.

One method for preparing the chabazites of the invention involves mixing an alumina source, sodium hydroxide, potassium hydroxide, a tetramethylammonium (TMA) reagent (hydroxide, salt and/or hydrate), and a silica source to form an aqueous gel in which the ratio of $TMA_2O$ to alumina is 0.08 to 0.0001, crystallizing the gel by heating at from about 25° to 150° C. for at least one hour, separating the chabazite, and converting it into its divalent form. Details of a preferred preparation are contained in copending application Ser. No. 07/334,642 filed simultaneously herewith and incorporated herein by reference for all that it discloses.

Dehydration of the divalent cation-containing chabazite to a level of optimum performance can be carried out by any method which will remove the water from the zeolite cavity, including water surrounding the cations, without causing the collapse of the zeolite structure. To achieve this in a practical manner, the chabazite can be maintained at temperature in the range of 250°–500° C. under any conditions suitable to lower the water content of the zeolite to less than about 1.5% without causing structural damage to the zeolite.

The invention is further illustrated but is not intended to be limited by the following examples in which all parts and percentages are by weight unless otherwise indicated. In the examples, nitrogen and argon isotherms are measured at 30° C. from 0 to 1 atmosphere using a volumetric adsorption apparatus. Prior to the uptake measurements, each adsorbent is first thoroughly dehydrated for 16 to 18 hours to a final temperature of 400° C. unless otherwise indicated. In all cases the samples are heated at 1 to 2° C per minute up to the desired temperature while maintaining a pressure of less than $10^{-5}$ Torr in the system. All adsorption uptakes are measured at 30° C. and 1 atmosphere pressure and are reported as cc(STP)/g.

EXAMPLE 1

Aluminum hydroxide (60.6 g), sodium hydroxide (160.32 g), potassium hydroxide (87 g), tetramethylammonium hydroxide pentahydrate (TMA-OH) (0.56 g) and silica sol (1051.8 g) were mixed with water to produce a thick gel (composition 0.005 $[TMA]_2O$: 6.67 $Na_2O$:2.2 $K_2O$: 17.5 $SiO_2$:$Al_2O_3$:276 $H_2O$). The gel was stirred for 15 minutes, placed in a sealed Teflon-lined reactor heated to 95° C., and maintained at that temperature for three days. The product was separated by filtration, washed with water, and air dried. The product had an X-ray powder diffraction pattern characterized by the following data in which $I/I_0$ is the relative intensity and "d" is the interplanar spacing:

| 2θ | d(A) | 100 × $I/I_0$ |
| --- | --- | --- |
| 7.5 | 11.7 | 3 |
| 9.5 | 9.3 | 16 |
| 12.87 | 6.87 | 23 |
| 16.0 | 5.52 | 7 |
| 17.7 | 5.01 | 29 |
| 20.6 | 4.31 | 38 |
| 22.4 | 3.97 | 11 |
| 23.0 | 3.87 | 7 |
| 24.8 | 3.69 | 7 |
| 25.9 | 3.44 | 31 |
| 27.5 | 3.24 | 8 |
| 28.0 | 3.18 | 14 |
| 28.6 | 3.11 | 9 |
| 30.5 | 2.93 | 100 |
| 34.4 | 2.60 | 40 |
| 35.8 | 2.51 | 2 |
| 39.2 | 2.30 | 17 |
| 41.7 | 2.16 | 3 |
| 42.4 | 2.13 | 3 |
| 43.2 | 2.09 | 25 |
| 44.7 | 2.02 | 3 |
| 47.5 | 1.91 | 7 |
| 48.7 | 1.87 | 4 |
| 50.3 | 1.81 | 37 |
| 51.5 | 1.77 | 3 |
| 53.1 | 1.72 | 34 |

These x-ray data indicate that the product is essentially pure synthetic chabazite.

A portion of this product (6 g) was refluxed in 100 ml of a 1M $CaCl_2$ solution for two hours, filtered and washed with 250 ml water. The procedure was repeated three times. The calcium exchange level was about 92%, the nitrogen capacity was 40.0 cc(STP)/g, the Si/Al was 2.1, the $f_s$ was 0.97. and the $f_d$ was 0.74 for the product.

EXAMPLE 2

Figure 4:
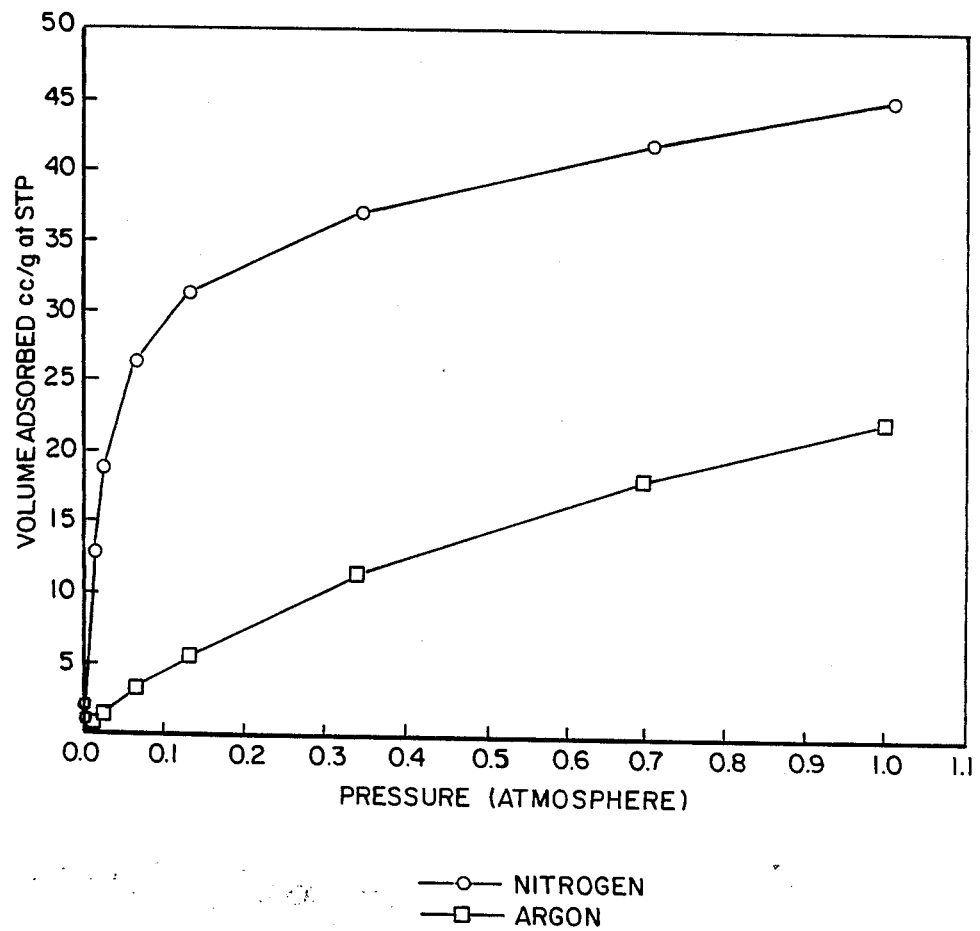
FIG. 4 shows the nitrogen and argon isotherms at 30° C. for the calcium form of a chabazite of the invention.

FIG. 4 shows the nitrogen and argon isotherms at 30° C. for the calcium form of the chabazite of Example 1. The chabazite adsorbent of the invention has about a 35% higher nitrogen adsorption capacity than prior calcium chabazites, and provides about a 50% improvement over prior chabazites in its ability to remove nitrogen from bulk gases.

The preferred adsorbent of the invention in the calcium exchanged form and having a Si/Al of 2, $f_s$ of 1 and $f_d$ of 1 will have a capacity of 56.3 cc/g nitrogen at 30° C. and 1 atm, or substantially 50% higher than the capacity of the best prior adsorbents known in the art. Further, in the operating range of this invention (i.e., the low pressure region), based on experimental adsorption studies, the preferred chabazite of the invention should have about twice the gas capacity for the minor constituent being separated from bulk gas.

FIG. 4 also shows that the chabazites of the invention have a large nitrogen capacity and high selectivity for nitrogen over argon at these conditions. Carrying out the purification at lower temperatures will further increase the capacity of the adsorbent of the invention for minor constituents in bulk gases.

The top three curves of FIG. 5 compare the nitrogen isotherms at 30° C. for a Nova Scotia chabazite (Si/Al=2.6) and a prior synthetic chabazite prepared by the procedure described in British Pat. No. 841,812 against the isotherm for the composition of Example 1. The prior synthetic chabazite is fully calcium exchanged and thoroughly dehydrated by heating at 2° C./minute to a final temperature of 400° C. and held there for 16-18 hours under less than $10^{-5}$ Torr Hg vacuum. The large enhancement in nitrogen capacity in the low pressure region for the chabazites of the invention is clearly evident.

EXAMPLE 3

The chabazite of Example 1 was ion-exchanged into the strontium form from the pure sodium form of the chabazite. Four exchanges with 1M $SrCl_2$ (0.5 1/10 g) produced a highly strontium exchanged sample.

Figure 6:
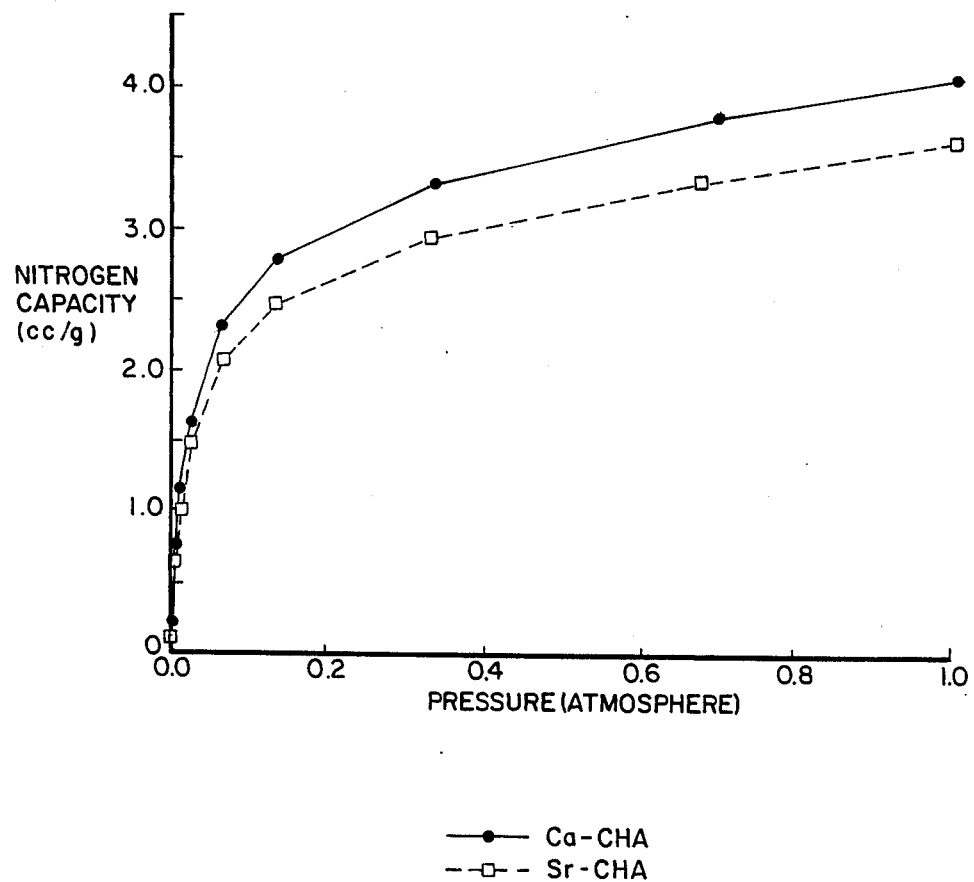
FIG. 6 compares the nitrogen isotherms at 30° C., 1 atm. for the same degree of exchange of calcium and strontium forms of the chabazite of the invention.

FIG. 6 provides a comparison between the nitrogen isotherms for calcium and strontium forms of the same chabazite. These data indicate that the strontium and calcium forms behave similarly.

EXAMPLE 4

Figure 7:
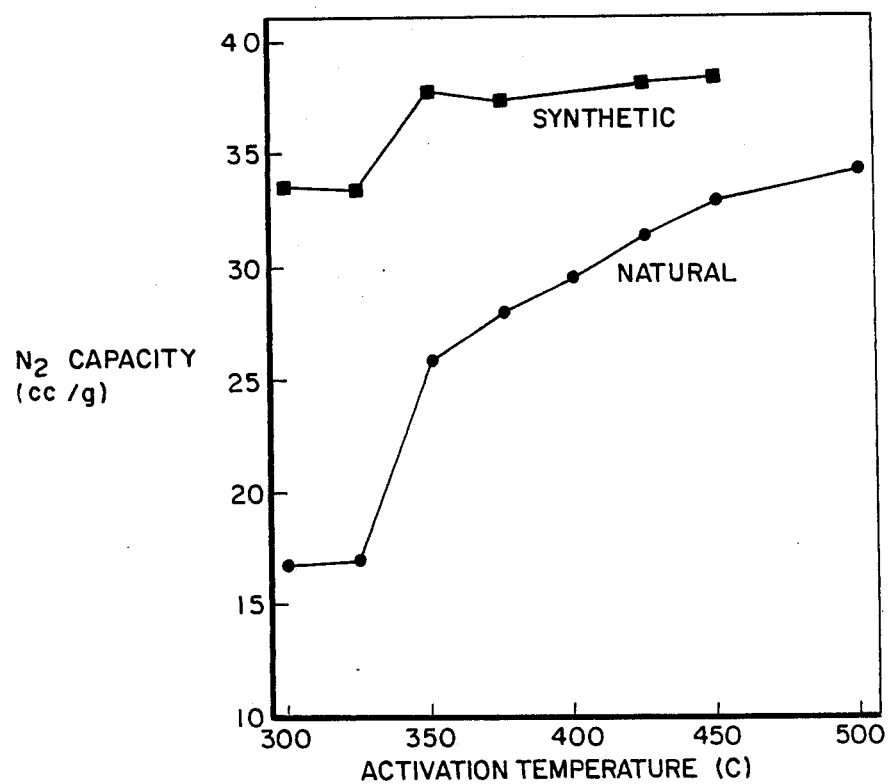
FIG. 7 shows adsorption of nitrogen measured at 30° C., 1 atm. on chabazites of the invention as a function of activation temperature.

The effect of dehydration temperature on nitrogen adsorption for a natural chabazite and the chabazite of Example 1 is given in FIG. 7. These data show that the synthetic chabazites of the invention reach their ultimate nitrogen adsorbing capacity at significantly lower dehydration temperatures compared to Nova Scotia (NS) chabazite. The chabazites of the invention reach essentially full capacity at 350° C. compared to about 500° C. for the Nova Scotia chabazite. At a commercially practical temperature range of from about 300°-375° C. for dehydration, the chabazites of the invention provide a 33%-100% improvement in nitrogen adsorption over Nova Scotia chabazite.

EXAMPLE 5

The thoroughly dehydrated, highly calcium exchanged samples of Examples 1 and 2 of U.S. Pat. No. 4.732,584 and the chabazite of Example 1 were tested to determine their nitrogen adsorption capability. The resultant nitrogen isotherms at 30° C. over a range of pressures, 0-1 atm, illustrate that the nitrogen capacity of the chabazites of the invention is significantly higher at any pressure. This effect is particularly striking in the low pressure region as shown in FIG. 5.

While the examples illustrate some preferred embodiments of the invention. similar results can be obtained using other embodiments suggested herein.

Although the invention has been described in considerable detail in the foregoing, it is to be understood that such detail is solely for the purpose of illustration and that variations may be made without departing from the spirit and scope of the invention except as set forth in the claims.

What is claimed is:

1. In a process for the selective adsorption of one or more minor constituents from a bulk gas stream with a chabazite in which the bulk gas is size excluded from the pore structure of the chabazite or the minor constituted to be separated has a heat of adsorption greater than the bulk gas, the improvement which comprises separating the minor constituents utilizing a dehydrated calcium-exchanged chabazite having a Si/Al ratio of 1.9 to 2.3, a cation siting value $f_s$, of about 0.9 to 1, a cation distribution value, $f_d$, of about 0.74 to 1 and an adsorption capacity, $C_v$, of at least about 40 cc $N_2/g$ at 30 ° C. and 1 atm under conditions such that the partial pressure of the minor constituent is in the linear low pressure region of the isotherm for the minor constituent.

2. The process of claim 1 wherein the minor constituent is nitrogen and the bulk gas is argon, hydrogen, helium, krypton, neon, xenon, tetrafluoromethane or mixtures thereof.

3. The process of claim 1 wherein the minor constituent is carbon monoxide, nitrogen, methane or mixtures thereof and the bulk gas is hydrogen or helium.

4. The process of claim 3 wherein the chabazite has an adsorptive capacity, $C_v$, of 45 to 56 cc $N_2/g$ at 30° C. and 1 atm.

5. The process of claim 1 wherein the chabazite has a Si/Al ratio of 2, a cation siting, $f_s$, of 1 and a cation distribution, $f_d$, of 1.

6. The process of claim 5 wherein the chabazite has an adsorptive capacity, $C_v$ of about 56 cc $N_2/g$ at 30° C. and 1 atm.

7. The process of claim 1 wherein the chabazite has the composition $Ca^{2+}{}_{x/2}[(SiO_2)_{12-x}(AlO_2)_x]$ wherein x=3.64-4.14.

* * * * *